United States Patent [19]
Krantz et al.

[11] Patent Number: 5,398,881
[45] Date of Patent: Mar. 21, 1995

[54] LIGHTWEIGHT VIDEO CASSETTE CARTRIDGE

[75] Inventors: Kermit T. Krantz; Charles R. Jones, Jr., both of Leawood, Kans.

[73] Assignee: V-Lite Corporation, Leawood, Kans.

[21] Appl. No.: 1,670

[22] Filed: Jan. 7, 1993

[51] Int. Cl.⁶ .......................................... G11B 23/087
[52] U.S. Cl. ................................ 242/347; 242/345.2
[58] Field of Search ................... 242/197, 198, 199; 360/132

[56] References Cited

U.S. PATENT DOCUMENTS

| | | | |
|---|---|---|---|
| 4,763,218 | 8/1988 | Westfall et al. | 360/132 |
| 4,819,890 | 4/1989 | Carroll | 242/76 X |
| 4,842,217 | 6/1989 | Vinson | 242/199 |
| 4,883,176 | 11/1989 | Hart et al. | 242/199 X |
| 4,969,612 | 11/1990 | Thomas | 242/199 |
| 5,092,536 | 3/1992 | Gelardi et al. | 242/199 |
| 5,114,092 | 5/1992 | Gelardi et al. | 242/199 |
| 5,199,662 | 4/1993 | Klupt | 242/199 |
| 5,199,663 | 4/1993 | Klupt | 242/199 |
| 5,201,476 | 4/1993 | Gelardi et al. | 242/199 |

FOREIGN PATENT DOCUMENTS 2104872  3/1983  United Kingdom ............... 242/199

*Primary Examiner*—Joseph J. Hail, III
*Assistant Examiner*—John P. Darling
*Attorney, Agent, or Firm*—Hovey, Williams, Timmons & Collins

[57] ABSTRACT

A lightweight, limited use video cassette cartridge that performs all of the needed functions of permanent-use video cassette cartridges, but comprises only eight parts, all made of thin gauge, recyclable synthetic resin material. The lightweight video cassette cartridge includes a top panel and a bottom panel which are mated to form the cartridge shell, a supply reel and a take-up reel rotatably mounted within the cartridge shell, a novel structure for maintaining the position of the reels within the cartridge while in use, leader tape for attaching the recorded video tape to the reels, two pieces of low coefficient Teflon tape, and a removable dust cover to protect the exposed video tape. The cartridge weighs less than 1.3 ounces when completely assembled and can be recycled without removing parts.

5 Claims, 2 Drawing Sheets

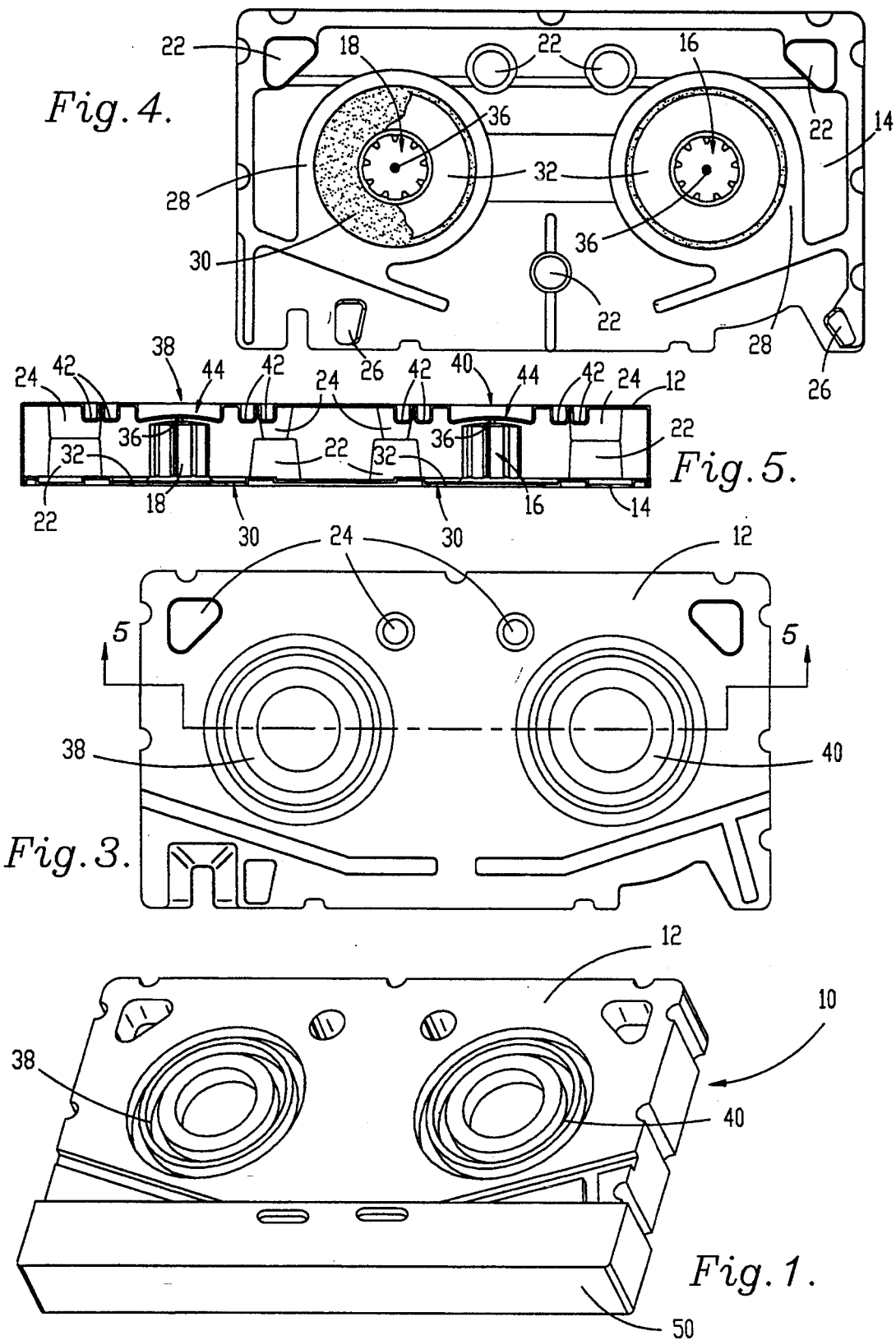

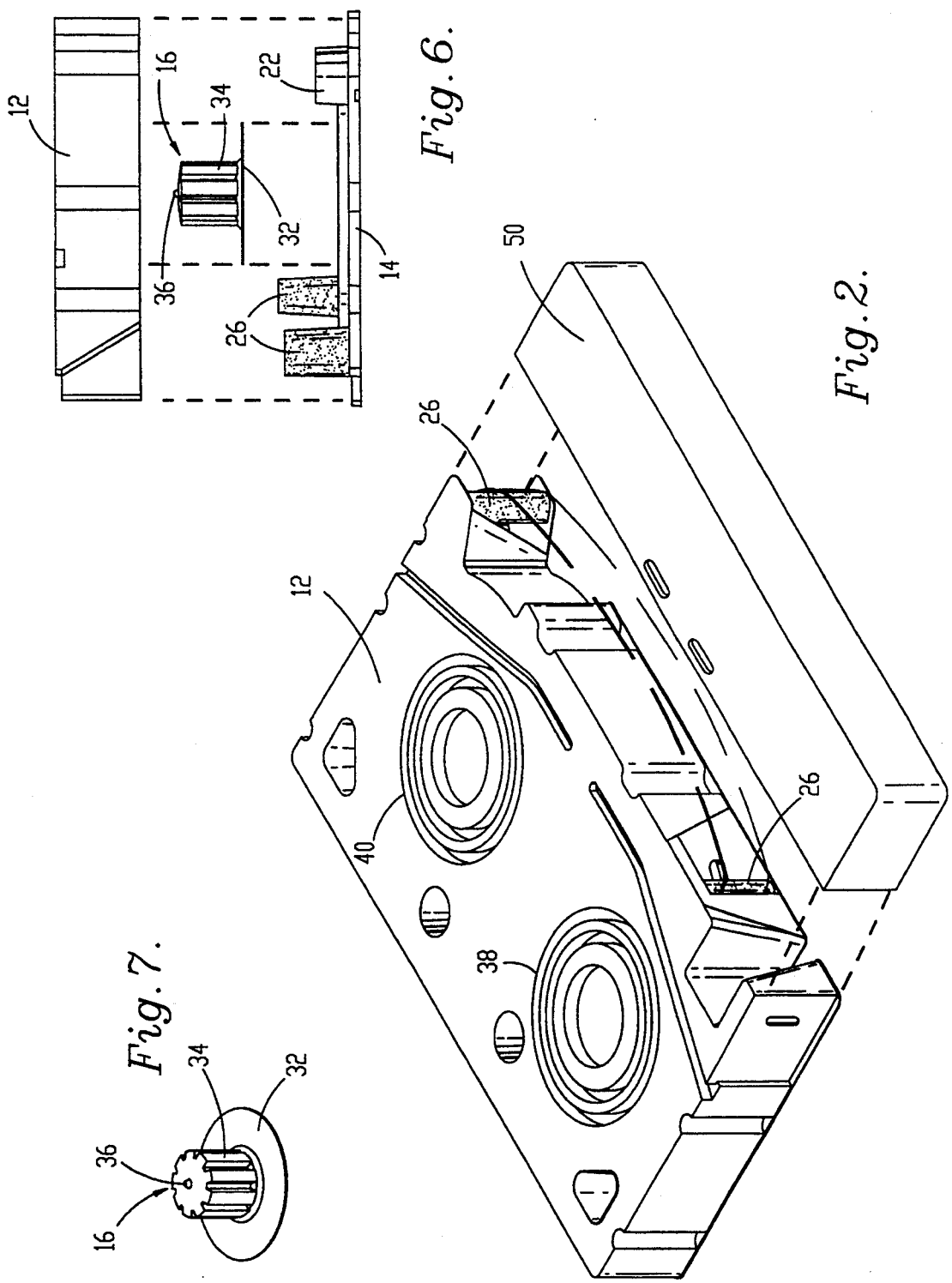

LIGHTWEIGHT VIDEO CASSETTE CARTRIDGE

FIELD OF THE INVENTION

This invention relates to an inexpensive, limited use video cassette cartridge, and more particularly to a video cassette cartridge made of lightweight, recyclable materials and a minimum of parts to facilitate manufacturing, use, disposal, and recyclability of the cartridge.

BACKGROUND OF THE INVENTION

The recent proliferation of consumer video cassette players and recorders has created a new market for video taped advertisements and messages. This new market has created an enormous demand for inexpensive and lightweight limited use video cassette cartridges that are suitable for mailing. These cassettes are also suitable for non-commercial recordings such as public service announcements and personal messages sent to family and friends.

Currently available limited use video cassette cartridges contain many individual parts of various materials which raises their cost and manufacturing time. In addition, the use of heavier materials in currently available limited use video cassette cartridges raises the weight of the assembled cartridge and the cost of postage.

A more particular limitation of currently available cassette cartridges is the need for internal springs to maintain the positioning of the tape reels. When the reels of a cartridge interact with the drive spindles of a video cassette recorder/player (VCR), the reels are subject to an upward force which tends to push the reels out of alignment. Currently available cartridges use internal steel springs or other tensioning devices mounted on the top panel of the cartridge to counteract this upward force and maintain reel alignment. These springs significantly add to the cost, weight, and time of manufacture of cassette cartridges. Another limitation of currently available cassette cartridges is the need for separately manufactured rollers mounted on the cartridge to guide the video tape out of the cartridge. These rollers also add to the cost, weight and time of manufacture of the cassette cartridges.

A third limitation of currently available cassette cartridges is the use of two-piece tape reels. To prevent the video tape from creeping up on the tape reels, the cassette cartridges use tape reels with a top and a bottom flange. The need for two flanges on each reel prevents the tape reels from being one-piece molded units, which raises the cost and time of manufacture and assembly. A yet further limitation of known cassette cartridges is the use of complicated tape reel lock and brake mechanisms for preventing the rotation of the tape reels during non-use.

The limitations described above prevent advertisers and consumers from making full use of video cassette cartridges. Thus, the prior art points out the need for a limited use video cassette cartridge which is made entirely of lightweight material and a minimum number of parts to take advantage of the expanding market for low priced, limited use recorded messages.

SUMMARY OF THE INVENTION

The present invention solves the prior art problems discussed above and provides a distinct advance in the state of the art. More particularly, the preferred embodiment of the present invention performs all of the needed functions of permanent-use cassette cartridges, but comprises only eight parts, including: a top panel and a bottom panel which are mated to form the cartridge shell, a video tape supply reel and a video tape take-up reel rotatably mounted within the cartridge shell, a novel means for maintaining the position of the reels within the cartridge while in use, leader tape for attaching the recorded video tape to the reels, two pieces of low coefficient Teflon tape, and a removable dust cover to protect the exposed video tape. All the parts of the cassette cartridge except the Teflon tape and leader tape are made of thin gauge, recyclable synthetic resin material, the cartridge weighing less than 1.3 ounces when completely assembled.

A preferred cassette cartridge shell comprises a top panel and a bottom panel which are sonic welded or glued together to form the cartridge shell. In particularly preferred forms, a pair of concavo-convex depressions integrally molded in the top panel bias the supply and take-up reels downward towards the bottom panel to counteract the upward force of the VCR drive spindles and to maintain reel alignment. The supply and take-up reels are one-piece thermoform molded units, each with one flange only.

The bottom panel includes first and second integrally molded, Teflon coated stationary guide posts configured to guide the exposed video tape out of the video cassette cartridge when in use and to provide structural rigidity to the assembled cartridge. Bottom panel also includes a pair of integrally molded ridges extending upwardly and defining circular wells in which the cassette reels rotate. The surfaces of the circular wells are textured to provide a friction brake system to inhibit the reels from rotating when the cassette cartridge is not in use.

BRIEF DESCRIPTION OF THE DRAWINGS

FIG. 1 is an isometric view showing the top, front, and right side of the preferred lightweight cassette cartridge with the dust cover attached;

FIG. 2 is an isometric view of the top, front, and left side of the cassette cartridge with the dust cover removed;

FIG. 3 is a top view of the cassette cartridge;

FIG. 4 is a plan view of the bottom panel and reels;

FIG. 5 is a sectional view of the cassette cartridge taken along line 5—5 of FIG. 3;

FIG. 6 is an exploded right side elevational view of the cassette cartridge;

FIG. 7 is an isometric view of one of the cassette reels.

DETAILED DESCRIPTION OF THE PREFERRED EMBODIMENT

Referring to the figures, lightweight video cassette cartridge 10 broadly includes top panel 12, bottom panel 14, supply reel 16, take-up reel 18, and removable dust cover 50. All of these parts are preferably composed of thin gauge synthetic resin material for economy of manufacture, recyclability, and low weight. The entire cassette cartridge weighs less than 1.3 ounces when fully assembled, compared to nearly 6 ounces for standard cassette cartridges.

Bottom panel 14 includes a plurality of upwardly extending support posts 22 which are bonded to corresponding support posts 24 on top panel 12 to form the cartridge shell. The support posts 22 and 24 are integrally molded on the corresponding bottom panel 14 and top panel 12 and give the assembled cassette cartridge significant rigidity and structural integrity. Bottom panel 14 also includes a pair of integrally molded ridges 28 extending upwardly from bottom panel 14 and defining circular wells 30 in which the cassette reels 16 and 18 rotate. The surfaces of the circular wells 30 are textured during the molding process to provide a friction brake system to inhibit the reels 16 and 18 from rotating when the cassette cartridge is not in use. The flanges 32 of the reels 16 and 18 are also textured to increase the friction between the reels and the circular wells 30. The use of this friction braking system eliminates the need for complicated active braking systems found in currently available cassette cartridges.

Bottom panel 14 includes a pair of upwardly extending fixed guide posts 26 for guiding the video tape out of the cassette cartridge 10 and for providing structural integrity to the assembled cartridge. The guide posts are integrally molded on the bottom panel 14 and are essentially rectangular in shape with rounded edges. As can be seen in FIG. 4, the guide posts 26 present inwardly angled surfaces which engage the video tape and guide the video tape out of and back into the cassette cartridge. The guide posts include a Teflon coating to decrease friction between the video tape and the guide posts 26. The guide posts 26 serve the same function as rollers used in currently available cassette cartridges, but conserve manufacturing time and cost due to their integral nature, and also serve the added function of providing substantial structural rigidity to the assembled cartridge.

Supply reel 16 and take-up reel 18 are one-piece thermoform molded units including a single flange 32, drum 34 and nipple 36. The video tape is initially wound on the drum 34 of the supply reel 16 and is transferred to the take-up reel 18 during play. The reels 16 and 18 are rotatably mounted within the video cassette cartridge shell and rotate within molded ridges 28 defining circular wells 30 of the bottom panel 14. The reels 16 and 18 are configured to interact with the drive spindles of a VCR. As those skilled in the art will appreciate, when the video cassette cartridge is in use, video tape tends to creep up on the take-up reel, causing the tape to wind improperly and jam. In the prior art, tape reels include both a top and a bottom flange to prevent the tape from creeping up on the reel. The need for two flanges on each reel prevents the tape reels from being molded of one piece of material, which raises the cost and time of manufacture and assembly.

As those skilled in the art will further appreciate, when the video cassette cartridge is in use, the reels 16 and 18 are subjected to an upward force from the VCR drive spindles which tends to push the reels upward towards the top panel 12 and out of the reel rotation wells 30. Known video cartridges use separate internal steel springs or tensioning devices mounted on the top panel of the cartridge to counteract this upward force and maintain reel alignment. These springs significantly add to the cost, weight, and time of manufacture of cassette cartridges and defeat recyclability. The present invention provides distinctive solutions to these problems.

Top panel 12 includes structure for maintaining the alignment and position of reels 16 and 18 within the reel rotation wells 30 and for preventing the video tape from creeping up on the take-up reel. The video tape and reel position maintaining structure consists of a pair of concavo-convex depressions 38 and 40 integrally molded in top panel 12 and extending inwardly from the top panel towards the nipples 36 of reels 16 and 18 respectively. The concavo-convex depressions 38 and 40 are configured to exert an opposing downward force upon the reel nipples 36 when subjected to an upward force delivered by the VCR spindles through reels 16 and 18. The concavo-convex depressions serve the dual functions of maintaining the position of the tape reels and preventing the video tape from creeping up on the take-up reel. As can be seen in FIG. 5, the concavo-convex depressions 38 and 40 each include a center portion 44 extending inwardly from top panel 12 which engages reel nipple 36 and a pair of concentric reinforcing ribs 42 extending inwardly from top panel 12 and surrounding the center portion 44 to add strength to the concavo-convex depressions.

To assemble the cassette cartridge, the reels 16 and 18 are loaded with a prerecorded video tape and inserted into corresponding wells 30 in bottom panel 14. The reels 16 and 18 are rotatably mounted within molded ridges 28 defining circular wells 30 of the bottom panel 14. The video tape is then pulled over Teflon coated guide posts 26 which guide the video tape out of and back into the cassette cartridge. To complete the cassette cartridge, top panel 12 is mated with bottom panel 14, and bottom panel support posts 22 are bonded to top panel support posts 24.

As shown in FIG. 5, when top panel 12 is bonded to bottom panel 14, the center portions 44 of concavo-convex depressions 38 and 40 engage reel nipples 36 of reels 16 and 18 respectively. When the cassette cartridge is in use, the spindles of a VCR exert an upward force on reels 16 and 18 which tends to push the reels 16 and 18 upwards and out of alignment. The center portions 44 of the concavo-convex depressions 38 and 40 are configured to exert an opposing downward force upon the reel nipples 36 when flexed. This downward force allows the reels to rotate within the reel wells 30 but maintains their alignment and prevents them from being pushed out of the reel wells 30. The concavo-convex depressions 38 and 40 also prevent the video tape from creeping up on the take-up reel by providing an inwardly extending surface which serves as a top reel flange.

The lightweight cassette cartridge also includes a removable dust cover 50 which slips over the front end of the cartridge to protect the exposed video tape from contamination or damage when the cartridge is not in use.

As those skilled in the art will appreciate, the present invention encompasses many variations in the preferred embodiment described herein. For example, the reel position maintaining structure integrally molded in the top panel could be of various shapes and sizes. While the invention has been described with reference to specific embodiments, modifications and variations may be constructed without departing from the scope of the invention.

Having described the invention, what is claimed is:

1. A lightweight video cassette cartridge for holding and dispensing video tape for use in a video cassette recorder/player, comprising:
   a cartridge shell including a top panel and a bottom panel which mate to form said shell;
   a supply reel and a take-up reel rotatably mounted within said cartridge shell and configured for receiving and winding video tape, said reels being subject to an upward force from the video cassette recorder/player which tends to push the reels out of alignment, said reels being further subjected to the upward creeping of the video tape during winding of the reels;

a plurality of concave depressions integrally formed in said top panel for maintaining the alignment and position of said reels and for preventing the creeping of the video tape on said reels.

2. The video cassette cartridge as set forth in claim 1, including a pair of said concave depressions, wherein said depressions extend inwardly from said top panel towards said reels, said depression being configured to exert an opposing downward force on said reels when subjected to the upward force delivered by the video cassette recorder/player.

3. The video cassette cartridge as set forth in claim 2 further including a plurality of reinforcing ribs integrally molded in said top panel concentrically surrounding said concave depressions, wherein said reinforcing ribs are configured to add structural rigidity to said concave depressions.

4. The video cassette cartridge as set forth in claim 2, said top and bottom panels, said reels and said concave depressions being thermoformed of thin gauge synthetic resin material.

5. A lightweight video cassette cartridge for holding and dispensing video tape for use in a video cassette recorder/player, comprising:

a shell including a top panel and a bottom panel that mate to form the shell, the bottom panel including a pair of spaced holes;

a supply reel and a take-up reel for receiving and winding video tape, the supply and take-up reels each including a hollow drum including a first open end and an opposed closed end, and an annular flange extending outward from the drum at the first open end;

well defining means formed in the bottom panel around the holes for defining wells within which the supply and take-up reels are supported for rotation relative to the shell; and a biasing means for biasing the reels into the wells toward the bottom panel and for maintaining the first open ends of the reel drums in alignment with the holes in the bottom panel, the biasing means including a pair of depressions formed in the top panel in alignment with the holes in the bottom panel, wherein each depression presents a circular bearing surface that engages the closed end of one of the reels.

* * * * *